Aug. 16, 1960
V. C. SMITH
2,949,119
LIQUID HANDLING APPARATUS
Filed March 5, 1958
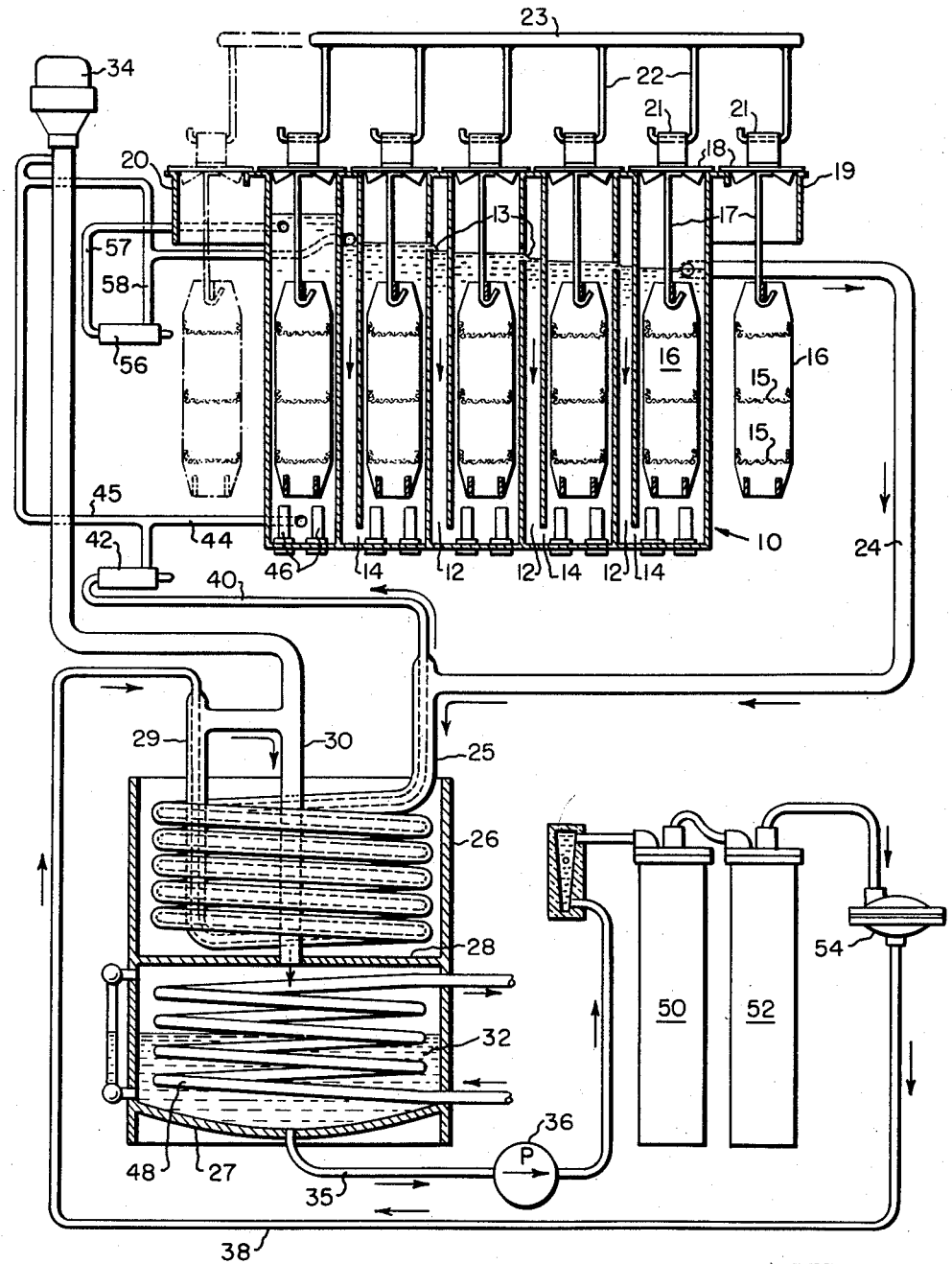
INVENTOR.
VERITY C. SMITH
BY *Kenway, Jenney,
Witter & Hildreth*
ATTORNEYS United States Patent Office 2,949,119
Patented Aug. 16, 1960

2,949,119

LIQUID HANDLING APPARATUS

Verity C. Smith, Dedham, Mass., assignor to Barnstead Still and Sterilizer Co., Boston, Mass., a corporation of Massachusetts Filed Mar. 5, 1958, Ser. No. 719,379

1 Claim. (Cl. 134—60)

This invention relates to liquid handling apparatus of a type in which a liquid is cyclically circulated between a high temperature stage and a low temperature stage. The invention is described wtih specific reference to washing apparatus employing a tank through which hot water of extreme purity is flowed and a purification system through which the same water is flowed at a lower temperature. The water is circulated between the tank and the purification system. An object of this invention is to provide for the efficient circulation of water in this manner without wasting undue amounts of heat.

A particular use of apparatus of this type is the washing of articles where the ultimate degree of cleanliness is desired. For instance, in the manufacture of transistors best results are obtained if the components are first thoroughly washed in hot water of extreme purity. In apparatus of this invention hot distilled water from a washing tank is constantly circulated through a purifier which includes a bed of charcoal or other sorbent material for removing organic impurities, a bed of mixed anion and cation exchange resins for removing dissolved electrolytes and a filter capable of removing submicroscopic particles as small as 0.45 microns in diameter. After it has been purified, the water is returned to the tank for reuse. The invention accordingly provides for repeated washing in a given quantity of distilled water which is continuously repurified.

A further feature of this invention is the provision of a heat cycle by which the water is cooled prior to its passage through the purification system to a temperature suitable for operations of this type. In this connection it is pointed out that most efficient operation of the purification system is at a temperature much lower than that in the washing tank. At high temperatures the life of ion exchange resins is greatly reduced.

The invention accordingly includes a countercurrent double-passage heat exchanger through one passage of which the water is flowed from the tank on its way to the purification system and through the other passage of which the water is flowed on its return from the purification system to the tank. Heating units within the tank and a cooling unit in contact with the stream of liquid entering the purification system serve to stabilize the temperatures to provide for proper operation of the heat exchanger. The heat consumption of the unit is accordingly extremely low since the heat from the liquid leaving the washing tank is transferred quite efficiently to the liquid flowing to the tank and only a small additional amount of heat need be supplied in the washing tank to compensate for heat losses.

The preferred embodiment of this invention is described in detail below with reference to the accompanying drawings which show the apparatus of this invention in schematic layout. In the preferred embodiment of the invention shown in the drawings a washing tank 10 is divided into 5 compartments by double wall partitions 12, each of which has an inlet opening 13 in a top of one wall and an outlet opening 14 near the bottom of the opposite wall such that liquid may be flowed from the top of one compartment downwardly through the partition into the bottom of the adjacent compartment. The articles to be washed are arranged on foraminous shelves 15 on racks 16 which are suspended on hooks 17 projecting downwardly from cover members 18 resting on the upper edges of the compartment. A loading station 19 and an unloading station 20, each adapted to receive a cover member 18 to carry a rack 16 outside the tank 10 are provided at opposite ends of the tank. Each of the cover members 18 is formed with one or more upwardly projecting hooks or loops 21 which may be engaged by hooked legs 22 of a handle member 23. With this arrangement all of the cover members 18 with a tray 16 suspended from them may be lifted simultaneously and moved to the next adjacent compartment, with the rack at the loading station 19 being moved into one end compartment while the rack from the other end compartment is moved onto the unloading station 20. Each rack is thus moved through each of the compartments from one end to the other, preferably in a direction countercurrent to the direction of flow through the compartments. An efficient washing of articles arranged on the racks is thus provided for.

The downstream compartment of the tank 10 connects at its upper end with an outlet conduit 24 which in turn connects with the outer tube of a double tube heat exchanger 25 which is shown in the form of a coil arranged within a cylindrical casing 26. The lower portion of the casing 26 is enclosed between a bottom wall 27 and top wall 28 to form a sump 32 into which the effluent from the washing tank 10 is carried. The outer tube of the double tube heat exchanger 25 terminates in an upright portion 29 and discharges into a sump inlet conduit 30, the upper end of which communicates with a vent 34, preferably the type described in U.S. Patent No. 2,703,153, arranged at an elevation above that of the level of liquid in the tank 10.

The sump 32 connects with an outlet conduit 35 leading to a pump 36 by which the liquid is circulated through a purification system and thence back to the heat exchanger 25 through a conduit 38 which connects with the inner tube of the heat exchanger 25 at the upstanding portion 29. The purified liquid is thus flowed through the heat exchanger 25 in a direction countercurrent to the flow of the effluent from the tank 10 and discharges at the end where the tank 10 effluent enters, through a conduit 40 which connects wtih a conductivity cell 42 in which the resistivity, and hence the purity, of the water may be measured. From the conductivity cell 42 the purified water flows through an inlet conduit 44 back to the tank 10. The inlet conduit 44 also connects with a vent tube 45 and to the vent 34.

A high tank temperature is maintained by electrical resistance heating units 46 mounted in the bottoms of the several compartments of the tank 10 and a cooled sump temperature is maintained by a cold water coil 48 within the sump 32, through which cold water may be circulated. It will be understood that the heating units 46 and cooling coil 48 simply stabilize the temperatures in the tank 10 and sump 32 respectively, and that the bulk of heating and cooling, which occurs simultaneously, takes place in the heat exchanger 25.

In the preferred embodiment illustrated the purification system consists in a first bed 50 of charcoal or other absorbent material capable of removing organic matter, through which the water is first percolated, and a second bed 52 composed of a mixture of anion and cation exchange resins capable of removing electrolytes from the solution, through which the water is next percolated.

Between the bed 50 and the bed 52 substantially all dissolved matter is removed from the water. Suspended solid material that may be present is removed in a filter 54 which is preferably of the type described in copending application Serial No. 702,057, filed December 11, 1957.

A means of measuring the thoroughness of washing consists in providing a second conductivity cell 56 in the outlet passageway between the first and second compartments of the tank 10. For this purpose the outlet from the first compartment consists of a conduit 57 leading to the conductivity cell 56 and a conduit 58 leading to the top of the space between the double wall partitions 12 separating the first and second compartments. The difference in conductivity between the inlet water to the first compartment, as measured by the conductivity cell 42, and the outlet from the first compartment, as measured by the conductivity cell 56, gives an indication of a degree to which impurities are removed in this compartment, which it will be appreciated is the last washing stage. The movement of the articles to be washed through the several compartments should be scheduled so that the difference in the two measurements is as low as practicable.

Although this invention has been described in detail with reference to its preferred embodiment it is contemplated that obvious modifications will occur to those skilled in the art and familiar with this disclosure and that such may be made without departing from the scope of this invention.

Having thus disclosed my invention and described in detail a preferred embodiment thereof, I claim and desire to secure by Letters Patent:

Washing apparatus including a washing tank having an inlet and an outlet and formed with a plurality of chambers interconnected for serial flow of liquid from chamber to chamber, means for moving articles to be washed through said tank from chamber to chamber, heating means for said liquid, a bed of sorbent material capable of removing impurities from said liquid at a lower temperature and means for continuously circulating said liquid from the outlet of said tank to said bed of sorbent material and back to the inlet of said tank comprising a countercurrent double passage heat exchanger having a first passage in out-of-contact heat exchange relation with a second passage, first conduit means for flowing liquid from the outlet of said tank to said bed including said first passage, second conduit means for flowing liquid from said bed to said inlet including said second passage connected in countercurrent relation to said first passage, and cooling means adapted to control the temperature of the liquid in said bed.

References Cited in the file of this patent

UNITED STATES PATENTS

| 630,958 | Wilson | Aug. 15, 1899 |
| 966,022 | Johnson | Aug. 2, 1910 |
| 1,471,718 | Bartlett | Oct. 23, 1923 |
| 2,245,673 | Huenerfauth | June 17, 1941 |
| 2,529,762 | Brisse | Nov. 14, 1950 |
| 2,697,050 | Barnes | Dec. 14, 1954 |
| 2,845,936 | Boynton | Aug. 5, 1958 |

FOREIGN PATENTS

| 184,166 | Great Britain | Nov. 19, 1923 |